(12) United States Patent
Vaucher (10) Patent No.: US 11,804,246 B2
(45) Date of Patent: Oct. 31, 2023

(54) AUTOMATIC VIDEO EDITING USING BEAT MATCHING DETECTION

(71) Applicant: SoClip!, Bandol (FR)

(72) Inventor: Christophe Vaucher, Bandol (FR)

(73) Assignee: SoClip!, Bandol (FR)

( * ) Notice: Subject to any disclaimer, the term of this patent is extended or adjusted under 35 U.S.C. 154(b) by 0 days.

(21) Appl. No.: 16/671,913

(22) Filed: Nov. 1, 2019

(65) Prior Publication Data

US 2020/0143839 A1 May 7, 2020

Related U.S. Application Data

(60) Provisional application No. 62/755,172, filed on Nov. 2, 2018.

(51) Int. Cl.
| | | |
|---|---|---|
| *G11B 27/036* | (2006.01) | |
| *G11B 27/06* | (2006.01) | |
| *G11B 27/10* | (2006.01) | |
| *H04N 5/93* | (2006.01) | |

(52) U.S. Cl.
CPC ............ *G11B 27/036* (2013.01); *G11B 27/06* (2013.01); *G11B 27/10* (2013.01); *H04N 5/9305* (2013.01)

(58) Field of Classification Search
CPC ... G11B 27/036; G11B 27/031; G11B 27/038; G11B 27/06; G11B 27/10; H04N 5/265; H04N 5/9305
USPC ......................................................... 386/241
See application file for complete search history.

(56) References Cited

U.S. PATENT DOCUMENTS

| | | | |
|---|---|---|---|
| 9,620,169 B1* | 4/2017 | Nolan | ................. G11B 27/031 |
| 2016/0342382 A1* | 11/2016 | Jehan | ...................... G06F 16/40 |
| 2019/0244639 A1* | 8/2019 | Benedetto | ............... G11B 27/11 |

* cited by examiner

*Primary Examiner* — Thai Q Tran
*Assistant Examiner* — Jose M Mesa
(74) *Attorney, Agent, or Firm* — Polsinelli (57) ABSTRACT

The subject disclosure relates to techniques for automatically editing multimedia content and in particular, to producing expert quality multimedia compositions that match musical transitions with visual transitions and effects. In some aspects, a process of the disclosed technology includes steps for receiving image content items, receiving a cut vector including at least a first-cut time and a second-cut time, and automatically mixing the image content items to produce an edited multimedia sequence, wherein a begin time of the edited multimedia sequence corresponds with the first-cut time, and an end time of the edited multimedia sequence corresponds with the second-cut time. Systems and machine-readable media are also provided.

18 Claims, 5 Drawing Sheets

AUTOMATIC VIDEO EDITING USING BEAT MATCHING DETECTION

CROSS-REFERENCE TO RELATED APPLICATIONS

This application claims the benefit of U.S. Application No. 62/755,172, filed Nov. 2, 2018, entitled "AUTOMATIC VIDEO EDITING USING BEAT MATCHING DETECTION", which is incorporated by reference in its entirety.

BACKGROUND

1. Technical Field

The subject technology relates generally to the field of video editing and in particular, to techniques for automatically mixing images, such as digital pictures and video, and music content.

2. Introduction

Producing moving and impactful films typically requires highly skilled editors and can be extremely time consuming and expensive. All the conditions that contribute to editing a video of professional quality, even for personal purposes, remain out of the reach of the average consumer.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Music and video mixing has been manually performed by human editors since the time video was invented. Beat matching, i.e., the process of matching video cuts and visual effects to musical beats has predominated the way in which video editing is performed. Conventionally, the beat matching is performed manually using video and audio inputs. However, the process of matching image and musical transitions is time consuming, and typically requires the work of an experienced editor to produce high-quality mixed media outputs. Given time and experience limitations, producing high-quality mixed audio/video multimedia is not something accessible to the average consumer.

Aspects of the disclosed technology address limitations of conventional video editing techniques by providing solutions for automatically performing beat detection and matching between music and video/image inputs, for example, to produce a mixed-media output of professional quality. In some aspects, the disclosed technology provides systems and methods for leveraging improved beat matching algorithms to automatically match music and image/scene transitions or animations (effects or "FX") for combined audio and video (image) inputs, in order to produce a high-quality mixed media output.

An editing system of the disclosed technology is configured to receive cut and effects (FX) vectors that provide time indices where transitions (cuts) and visual effects are to be added to received image content items. In some aspects, the cut and FX vectors can be data structures that include one-dimensional scalar arrays; however, other data formats may be used, without departing from the scope of the disclosed technology. Image content, including digital images and/or video content, can then be automatically edited using the cut and FX vectors to produce (edited) multimedia sequences that are bounded by cuts (transitions) at the beginning and end. Assembled collections of edited multimedia sequences can then be set to one or more musical selections such that image transitions and visual effects are made to correspond with various audio artifacts (e.g., drum beats or other notes) in the corresponding music.

Additional details relating to the use of beat matching algorithms used to derive the cut and FX vectors, as discussed herein, are provided by U.S. patent application Ser. No. 16/503,379, entitled "BEAT DECOMPOSITION TO FACILITATE AUTOMATIC VIDEO EDITING," which claims priority to U.S. Provisional Application No. 62/693,799 entitled, "BEAT DECOMPOSITION TO FACILITATE AUTOMATIC VIDEO EDITING," both of which are hereby incorporated by reference in their entirety.

The identification of musical artifacts is performed by first receiving a primary waveform representing a musical composition that has musical artifacts. The primary waveform is then filtered to generate alternative waveforms associated with the musical artifacts. The alternative waveforms are then analyzed to identify time points within the primary waveform that correspond to musical artifacts.

In some embodiments, the filtering of the primary waveform includes a first filtering that uses two or more interlaced band pass filters and outputs two or more secondary waveforms. The first filtering includes calculating samples' module for the secondary waveforms, identifying samples' modules that exceed a first predetermined frequency range threshold, identifying frequency ranges for each of the musical artifacts that have a most samples' module that exceeds the first predetermined frequency range threshold, and identifying a preliminary list of musical artifacts that are based on the most samples' module from the secondary waveforms that exceed the first predetermined frequency range.

In another embodiment, the filtering of the primary waveform includes a second filtering process of the primary waveform using either a low-pass filter or a resampling process that outputs a tertiary waveform. The second filter process includes calculating a tertiary waveform samples' so module moving average for each musical artifact frequency range and identifying for each of the musical artifacts at least one of samples' module moving average that exceeds a second predetermined frequency range threshold. The second filtering process then identifies a secondary list of musical artifacts that includes musical artifacts of the preliminary list, wherein the secondary list of musical artifacts includes the musical artifacts that have the samples' module moving average exceeding the second predetermined frequency range threshold at the time points within a range of with respect to the time points of the musical artifacts included on the preliminary list.

In a further embodiment, the filtering of the primary waveform also includes third filtering of the primary waveform using a high-pass filter that outputs a quaternary waveform. The third filtering process includes identifying samples' modules of the quaternary waveform that exceed a third predetermined second frequency range threshold identifying a tertiary list of musical artifacts that includes the musical artifacts of the secondary list. The tertiary list of musical artifacts includes the musical artifacts that have the samples' module of the quaternary waveform exceeding the third predetermined frequency range threshold within a range of t with respect to the time points of the musical artifacts included on the secondary list.

In some aspects, the disclosed technology also encompasses features than enable users to select and insert their own transitions and/or FX. For example, the user may be provided with a user interface (UI) that includes selectable options, such as a "beat grid," that provides intuitive graphical guidance to facilitate user selected insertions and visual effects into the edited multimedia content. User edits are made possible through editable boxes within the beat grid, which can be selected to permit the user to insert FX at specific temporal locations in the audio file.

As discussed in further detail below, aspects of the technology can be implemented using an API and a software development kit SDK that are configured to (1) automatically ingest, segment and process input (audio) files to determine hit/no-hit sections that can be used to produce cut and FX vectors; and (2) to automatically perform matching and rendering functions necessary to generate high-quality edited beat-matched video streams.

Figure 1A:
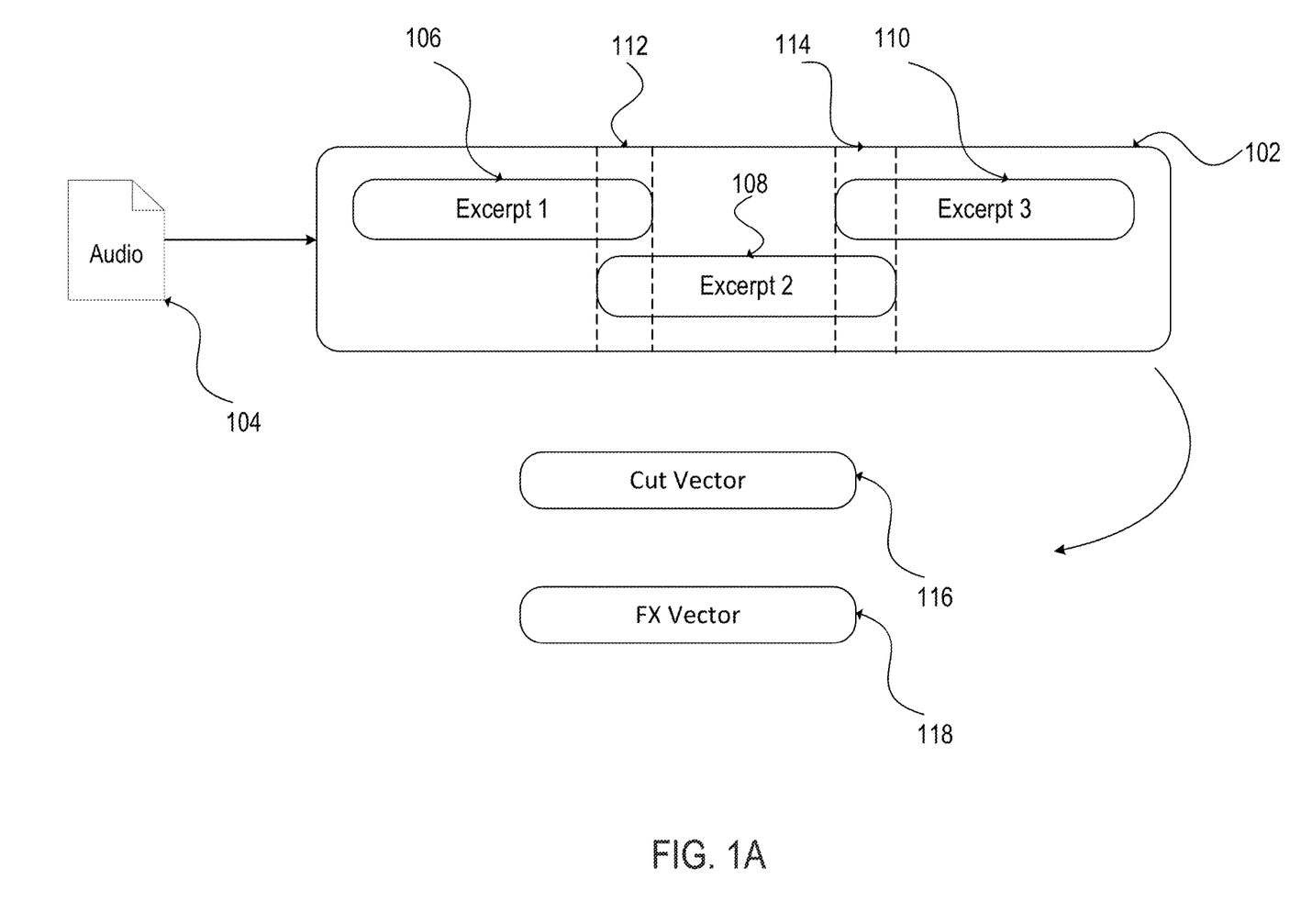
FIG. 1A conceptually illustrates the generation of a cut-vector and an effects ("FX") vector, according to some aspects of the disclosed technology.

FIG. 1A conceptually illustrates the generation of a cut-vector and an effects ("FX") vector using editing system 102, according to some aspects of the disclosed technology. Editing system 102 can be implemented using a variety of software, hardware and/or firmware modules, without departing from the scope of the disclosed technology. For example, in some aspects, editing system 102 may include software, such as a mobile application, and hardware that is resident on a mobile-computing device, such as a smartphone or tablet computer.

In practice, editing system 102 can be configured to receive an audio file 104, for example, using an application programming interface (API). Audio file 104 can be any file type or format that includes digital audio information. By way of example, audio file 104 may include MP3, MP4, or WAV encoded content. Once received, audio file 104 can be divided into parts or audio "excerpts" in order to enable quick processing and playback of multimedia content produced by editing system 102. In the example of FIG. 1A, audio file 104 is divided into excerpts 106, 108, and 110, i.e., Excerpt 1, Excerpt 2, and Excerpt 3, respectively.

By dividing audio file 104 into multiple excerpts (segments), beat match processing can be performed by editing system 104 in a parallel manner, and concurrent with playback to the user. In this way, the user experience is improved by enabling playback of the resulting edited output file to begin before the entire input file has been processed.

In some aspects, the audio input file may be broken into excerpts of a predetermined length, such as 30 seconds. As such, playback of the resulting edited output file can begin as soon as the first excerpt has completed processing. In such approaches, processing of subsequent audio excerpts begins before playback of the initial/previous segment has completed. In the example of FIG. 1A, overlap between Excerpt 1 106 and Excerpt 2 108 is illustrated by time duration 112, whereas overlap between Excerpt 2 108 and Excerpt 3 10110 is illustrated by time duration 114. The duration of the overlaps may be defined by system settings, or determined by user selected performance settings, etc.

Such overlaps allow overlap processing to begin of subsequent segments to be performed in parallel with the providing of edited output by editing system 102. By way of example, if time durations 112, 114 are 7.5 seconds, then processing of a subsequent excerpt can begin 7.5 seconds before playback of the previously edited excerpt has completed playback to the user. In this way, playback and beat-match processing are performed in parallel. Additionally, in some instances, where excerpts may differ in duration, then two excerpts can be optionally combined for processing and playback, etc. It is understood that other excerpt lengths, or overlap durations may be used, depending on system resources and the desired limitation, without departing from the scope of the disclosed technology.

Processed excerpts are then provided to a beat tracking algorithm to determine the location of specific audio artifacts (e.g., kick and snare drum hits) contained therein. As discussed above, aspects of a beat detection process, including algorithms for identifying the temporal locations of hit/snare drums in an audio composition are provided by U.S. patent application Ser. No. 16/503,379, entitled "BEAT DECOMPOSITION TO FACILITATE AUTOMATIC VIDEO EDITING," which claims priority to U.S. Provisional Application No. 62/693,799 entitled, "BEAT DECOMPOSITION TO FACILITATE AUTOMATIC VIDEO EDITING," both of which are hereby incorporated by reference in their entirety.

Once beat detection processing is completed, editing system 102 produces one or more cut vectors 116, and one or more effects ("FX") vectors 118, that can be further used to perform the editing operations described herein. Cut vector 116 contains cut-times indicating temporal locations in audio file 104 that correspond with audio characteristics where image transitions should be placed. Additionally, FX vector 118 contains time values indicating temporal locations where visual effects (FX) should be placed in the multimedia output.

Figure 1B:
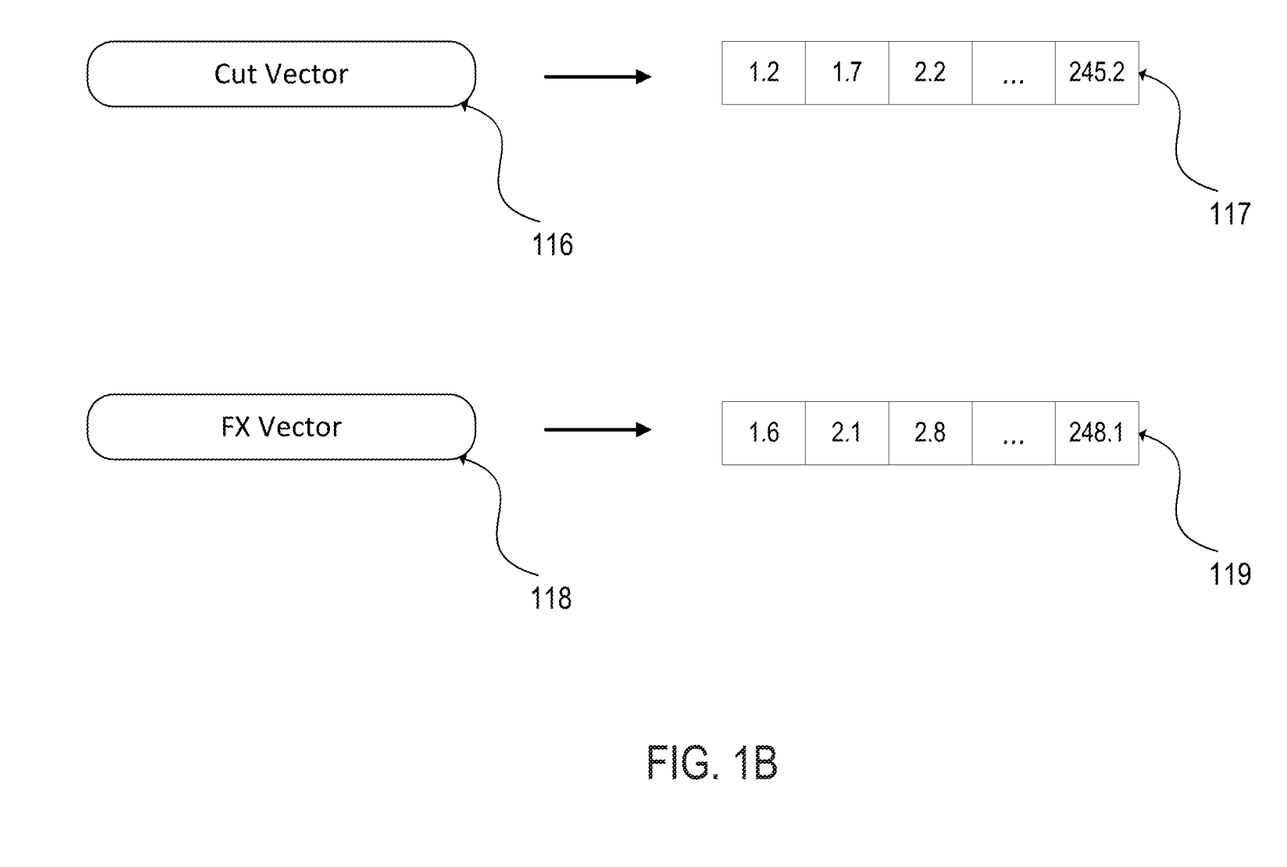
FIG. 1B conceptually illustrates a cut-vector and an FX vector, according to some aspects of the disclosed technology.

FIG. 1B conceptually illustrates an example of data contained in cut-vector 116 and FX vector 118, according to some aspects of the disclosed technology. As illustrated, cut-vector 116 contains a series of scalar time values 117 at different index locations. These values indicate temporal locations where cuts are to be placed in the image/video feed rendered by editing system 102. Similarly, FX vector 118 contains a series of scalar time values 119 that indicated temporal locations where various animation properties or FX are to be rendered by editing system 102. In this example, FX are applied between different cut times, i.e., at index 1 FX vector 118 indicates that an effect is to be applied at 1.6 seconds, which occurs between cut times at 1.2 s and 1.7 s, as indicated by indices 1 and 2 of cut vector 116.

Figure 2:
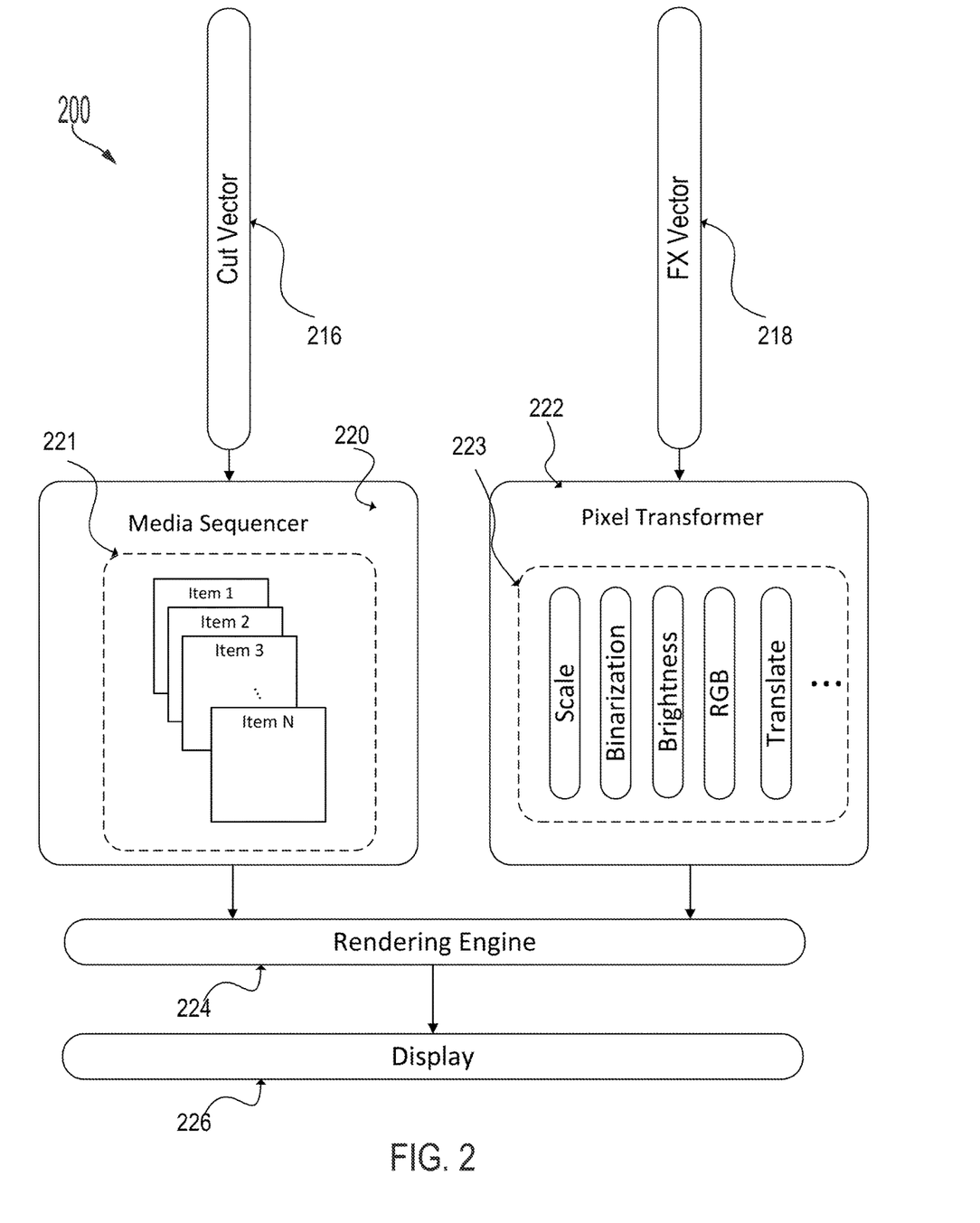
FIG. 2 is a simplified block diagram of an example editing system, according to some aspects of the disclosed technology.

FIG. 2 is a simplified block diagram of an example editing system 200, according to some aspects of the disclosed technology. In this example, a cut vector 216 is provided to media sequencer 220, and FX vector 218 is provided to pixel transformer 222. Media sequencer 220 is configured to receive cut vectors as well as image content items for which the musical selection (e.g., audio file 104) is to be mixed. As discussed above, image content items 221 can include digital image frames that make up image or video content. In some aspects, image content items are images/videos selected by a user. For example, image content items 221 may be provided to image sequencer 220 through the indication of a file path by the user. Image content items 221 are arranged by media sequencer 220, such that the frames occur between cuts indicated by the cut-times in cut vector 216. That is, one or more image content items (e.g., Item 1-Item N) are arranged such that the display of Item 1 occurs after a cut time indicated by cut vector 216, and display of Item N occurs before the subsequent cut time indicated by vector 216.

Pixel transformer 222 is configured to apply one or more selected visual/animation effects 223 to pixels displayed at time indices corresponding with the time values indicated by FX vector 218. In the example of pixel transformer 222, visual animation effects 223 include features to adjust pixel scale, binarization, brightness, color values (e.g., RGB values), and translation. It is understood that virtually any other animation properties or effects can be included in the set of animation effects 223 available to pixel transformer 222, without departing from the scope of the disclosed technology.

As discussed above, in some aspects, editing system 200 can be configured to allow for user editing of cut and FX points. In such implementations, editing system 200 can be configured to provide a user interface (UI) that provides user selectable options for selection and placement of cuts and or animation effects. By way of example, the UI can contain a cut/FX grid that enables the user to directly modify or augment processing performed by medial sequencer 220 and/or pixel transformer 222.

Outputs from media sequencer 220 and pixel transformer 222 are both provided to rendering engine 224 where they can be combined to produce an edited multimedia sequence. The multimedia sequence can contain cuts, effects, and image information of the image content items. As such, one or more edited multimedia sequences can be outputted by editing system 200 as fully edited and beat matched video sequences that are set to musical and graphical selections made by the user.

Once rendered, the resulting multimedia output can be provided to display 226 to be viewed by the user, so that it accurately matches the beat of the played song. By way of example, display 226 can be a touch-sensitive display of a mobile-electronic device, such as a smartphone or tablet computer. However, display 226 can include any number of displays including remote displays that are not resident on the processing device that is used to implement editing system 200.

Figure 3:
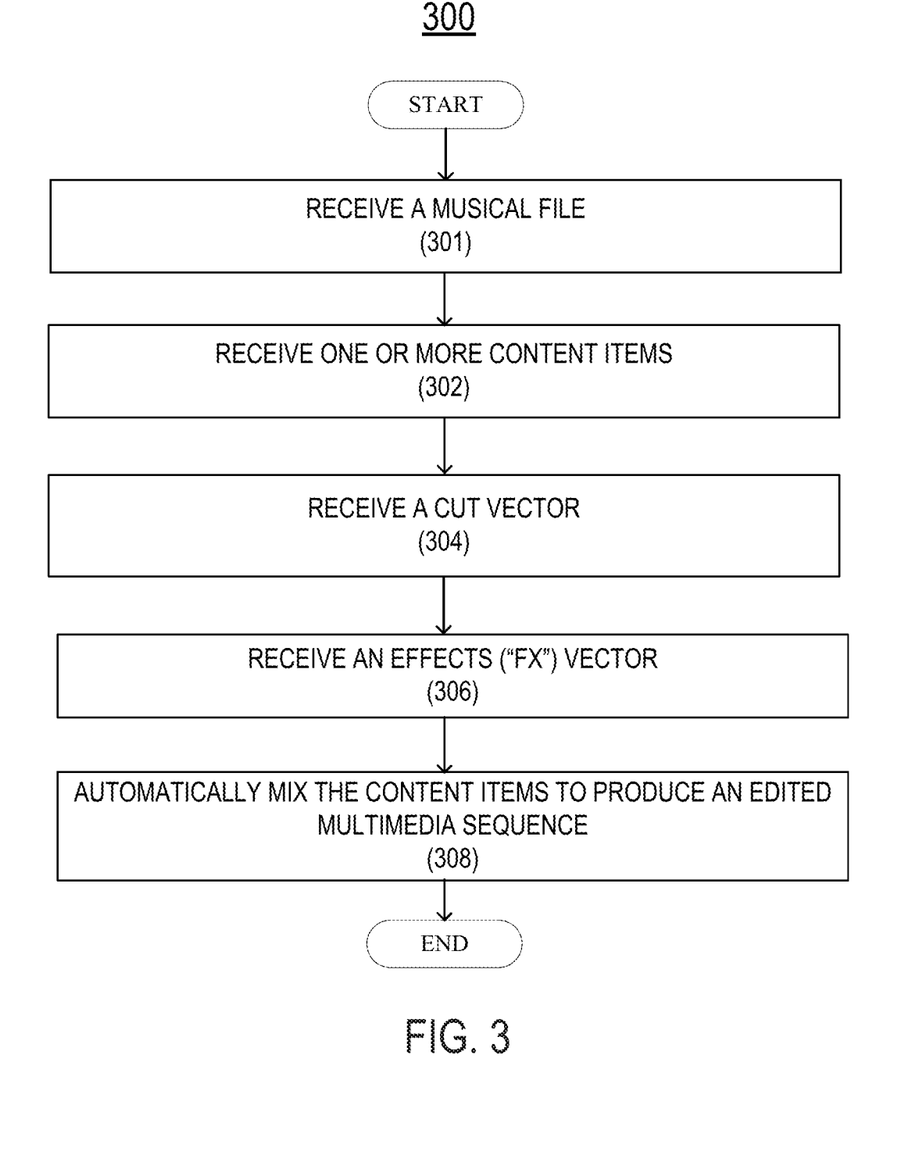
FIG. 3 provides steps of an example process for using cut and FX vectors to produce a beat-matched multimedia output, according to some aspects of the disclose technology.

FIG. 3 provides steps of an example process 300 for using cut and FX vectors to produce a beat-matched multimedia output, according to some aspects of the disclosed technology. Process 300 begins with step 301 in which an audio (musical) file is received by the editing system. Depending on the desired implementation, the editing system can include an application, for example, that is executed on a mobile-device, such as a smartphone or tablet computing device. In other implementations, editing system may be implemented by distributed software and/or hardware systems, such as in one or more network containers that are instantiated on a cloud computing platform. The musical file can be one that is selected by a user, i.e., for which the user wishes to perform beat tracking. In some implementations, the user selection may include the user providing a file path indicating a location of the musical file to the editing system, in this way the editing system can retrieve the musical file for beat tracking and further processing, as described in further detail below.

In step 302, one or more (image) content items are received, for example, by the editing system of the disclosed technology. Depending on the desired implementation, the editing system can include an application, for example, that is executed on a mobile-device, such as a smartphone or tablet computing device. In other implementations, editing system may be implemented by distributed software and/or hardware systems, such as in one or more network containers that are instantiated on a cloud computing platform. Receipt of the image content items can be performed using an API, or other intermediary software layers. In some aspects, the image content items can include user selected images, videos or other graphical content, e.g., graphical image formatted "gif" files, and the like.

In step 304, a cut vector is received by the editing system. The cut vector can include one or more cut-times, or values that indicate temporal locations where transitions (image changes) are to be places in a multimedia composition. As discussed above, the cut vector can result from beat decomposition that is performed by a beat tracking algorithm, for example, on one or more audio files that are provided/selected by the user. As such, the cut vector contains information regarding how image content is to be mixed with a specific audio file selection, for example, based on beat properties of the audio file.

At step 306, the editing system receives an FX vector that includes one or more time values indicating temporal locations where pixel animations or visual effects are to be provided in a resulting multimedia composition.

Next, at step 308, the content items are mixed to produce an edited multimedia sequence based on the cut vector and the FX vector. As discussed above, the resulting edited multimedia sequence can include one or more frames from the content items, and is bounded by cut points indicated by the cut vector. For example, the resulting edited multimedia sequence can include begin at a first-cut time indicated by the cut vector, and end at a second-cut time indicated by the cut vector. Between the begin-time and end-time, one or more graphical effects can be applied to the pixels of frames of the corresponding content items. For example, animations/effects can be applied at one or more times indicated by time values of the FX vector. In some instances, effects/animations may correspond with the begin/end times provided by the cut vector. However, it is understood that effects may be provided to image frames at times between any cut points indicated by the cut vector. Further to the example provided in FIG. 1B, the first-cut and second-cut times may be places at 1.2 s and 1.7 s, respectively, whereas effects/animations are inserted by visually modifying pixels of frames displayed beginning at 1.6 s.

Figure 4:
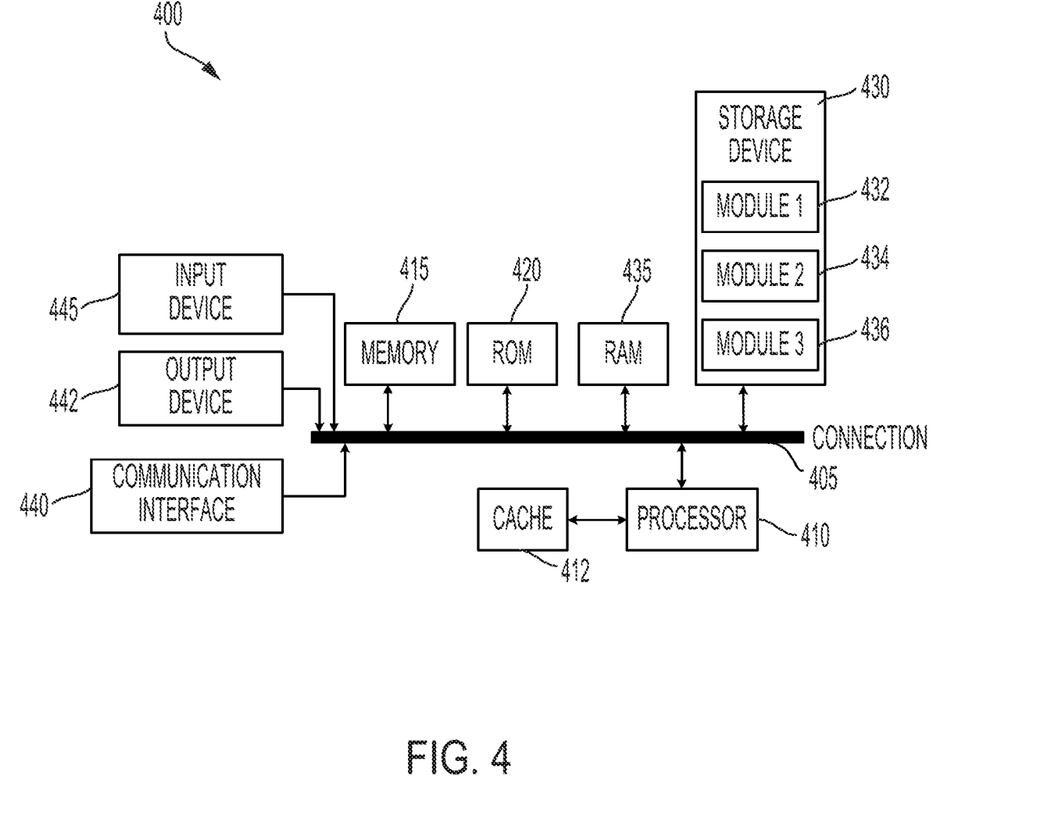
FIG. 4 illustrates an example of an electronic system, such as a smart phone or tablet computing device, that can be used to implement various aspects of the disclosed technology.

Specifically, FIG. 4 illustrates system architecture 400 wherein the components of the system are in electrical communication with each other using a bus 405. System architecture 400 can include a processing unit (CPU or processor) 410, as well as a cache 412, that are variously coupled to system bus 405. Bus 405 couples various system components including system memory 415, (e.g., read only memory (ROM) 420 and random access memory (RAM) 435), to processor 410. System architecture 400 can include a cache of high-speed memory connected directly with, in close proximity to, or integrated as part of the processor 410. System architecture 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. Memory 415 can include multiple different types of memory with different performance characteristics. Processor 410 can include any general-purpose processor and a hardware module or software module, such as module 1 (432), module 2 (434), and module 3 (436) stored in storage device 430, configured to control processor 410 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system architecture 400, input device 445 can represent any number of input mechanisms, such as a microphone for speech, a touch-sensitive screen for gesture or graphical input, keyboard, mouse, motion input, and so forth. An output device 442 can also be one or more of a number of output mechanisms. In some instances, multimodal systems can enable a user to provide multiple types of input to communicate with the computing system architecture 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 435, read only memory (ROM) 420, and hybrids thereof.

Storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 442, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

Statement Bank

Statement 1: a computer-implemented method for mixing multimedia content, comprising: receiving, by an editing system, one or more image content items; receiving, by the editing system, a cut vector comprising at least a first-cut time and a second-cut time, wherein the cut vector is derived from a musical file received by the editing system; and; and automatically mixing, by the editing system, the one or more image content items to produce an edited multimedia sequence, wherein a begin time of the edited multimedia sequence corresponds with the first-cut time, and an end time of the edited multimedia sequence corresponds with the second-cut time.

Statement 2: the computer-implemented method of statement 1, wherein automatically mixing the one or more image content items further comprises: receiving an effects vector comprising a plurality of time values, wherein each of the time values is associated with an animation property; applying a first animation effect to at least one of the one or more content items of the edited multimedia sequence at the begin time based on a first animation property indicated by the effects vector; and applying a second animation effect to at least one of the one or more content items of the edited multimedia sequence at the end time based on a second animation property indicated by the effects vector.

Statement 3: the computer-implemented method of any of statements 1-2, wherein automatically mixing the one or more image content items further comprises: combining the edited multimedia sequence with a digital music file to produce a mixed multimedia output file.

Statement 4: the computer-implemented method of any of statements 1-3, wherein the first-cut time value and the second-cut time value correspond with audio artifacts in a digital music file.

Statement 5: the computer-implemented method of any of statements 1-4, wherein the first-cut time and the second-cut time correspond with audio artifacts in an audio composition.

Statement 6: the computer-implemented method of any of statements 1-5, wherein the one or more image content items comprises a digital image.

Statement 7: the computer-implemented method of any of statements 1-6, wherein the one or more image content items comprises a digital video.

Statement 8: a system for automatically mixing multimedia content, the system comprising: one or more processors; and a computer-readable medium comprising instructions stored therein, which when executed by the processors, cause the processors to perform operations comprising: receiving, by an editing system, one or more image content items; receiving, by the editing system, a cut vector comprising at least a first-cut time and a second-cut time, wherein the cut vector is derived from a musical file received by the editing system; and; and automatically mixing, by the editing system, the one or more image content items to produce an edited multimedia sequence, wherein a begin time of the edited multimedia sequence corresponds with the first-cut time, and an end time of the edited multimedia sequence corresponds with the second-cut time.

Statement 9: the system of statement 8, wherein automatically mixing the one or more image content items further comprises: receiving an effects vector comprising a plurality of time values, wherein each of the time values is associated with an animation property; applying a first animation effect to at least one of the one or more content items of the edited multimedia sequence at the begin time based on a first animation property indicated by the effects vector; and applying a second animation effect to at least one of the one or more content items of the edited multimedia sequence at the end time based on a second animation property indicated by the effects vector.

Statement 10: the system of any of statements 8-9, wherein automatically mixing the one or more image content items further comprises: combining the edited multimedia sequence with a digital music file to produce a mixed multimedia output file.

Statement 11: the system of any of statements 8-10, wherein the first-cut time value and the second-cut time value correspond with audio artifacts in a digital music file.

Statement 12: the system of any of statements 8-11, wherein the first-cut time and the second-cut time correspond with audio artifacts in an audio composition.

Statement 13: the system of any of statements 8-12, wherein the one or more image content items comprises a digital image.

Statement 14: the system of any of statements 8-13, wherein the one or more image content items comprises a digital video.

Statement 15: a non-transitory computer-readable storage medium comprising instructions stored therein, which when executed by one or more processors, cause the processors to perform operations comprising: receiving, by an editing system, one or more image content items; receiving, by the editing system, a cut vector comprising at least a first-cut time and a second-cut time, wherein the cut vector is derived from a musical file received by the editing system; and; and automatically mixing, by the editing system, the one or more image content items to produce an edited multimedia sequence, wherein a begin time of the edited multimedia sequence corresponds with the first-cut time, and an end time of the edited multimedia sequence corresponds with the second-cut time.

Statement 16: the non-transitory computer-readable storage medium of statement 15, wherein automatically mixing the one or more image content items further comprises: receiving an effects vector comprising a plurality of time values, wherein each of the time values is associated with an animation property; applying a first animation effect to at least one of the one or more content items of the edited multimedia sequence at the begin time based on a first animation property indicated by the effects vector; and applying a second animation effect to at least one of the one or more content items of the edited multimedia sequence at the end time based on a second animation property indicated by the effects vector.

Statement 17: the non-transitory computer-readable storage medium of any of statements 15-16, wherein automatically mixing the one or more image content items further comprises: combining the edited multimedia sequence with a digital music file to produce a mixed multimedia output file.

Statement 18: the non-transitory computer-readable storage medium of any of statements 15-17, transitory computer-readable storage medium of claim 15, wherein the first-cut time value and the second-cut time value correspond with audio artifacts in a digital music file.

Statement 19: the non-transitory computer-readable storage medium of any of statements 15-18, wherein the first-cut time and the second-cut time correspond with audio artifacts in an audio composition.

Statement 20: the non-transitory computer-readable storage medium of any of statements 15-19, wherein the one or more image content items comprises a digital image.

What is claimed is:

1. A computer-implemented method for mixing multimedia content, comprising:
   receiving a musical file at an editing system;
   generating a cut vector derived from a plurality of identified temporal locations of a detected audio characteristic in the received musical file, wherein the identified temporal locations are identified based on analyzing alternative waveforms filtered from a primary waveform of the received musical file, and wherein two adjacent intervals formed by three identified temporal locations of the plurality of identified temporal locations are different;
   receiving image content items that are separate from the musical file;
   providing the image content items to an image sequencer;
   arranging, at the image sequencer of the editing system, the image content items such that frames occurring between cuts are indicated by cut times in the cut vector, wherein a first content item of the image content items occurs after a cut time indicated by cut vector, and a last content item of the image content items occurs before a subsequent cut time indicated by the cut vector; and
   outputting an edited multimedia sequence from a rendering of the image content items with the musical file.

2. The computer-implemented method of claim 1, further comprising:
   receiving an effects vector comprising a plurality of time values, wherein each of the time values is associated with an animation property;
   applying a first animation effect to at least one of the image content items of the edited multimedia sequence at a first time value of the plurality of time values based on a first animation property indicated by the effects vector; and
   applying a second animation effect to at least one of the image content items of the edited multimedia sequence at a second time value of the plurality of time values based on a second animation property indicated by the effects vector.

3. The computer-implemented method of claim 1, further comprising:
   combining the edited multimedia sequence with a digital music file to produce a mixed multimedia output file.

4. The computer-implemented method of claim 2, wherein the plurality of time values of the effects vector correspond with audio artifacts in the musical file.

5. The computer-implemented method of claim 1, wherein the image content items comprises a digital image.

6. The computer-implemented method of claim 1, wherein the image content items comprises a digital video.

7. A system for automatically mixing multimedia content, the system comprising:
   one or more processors; and
   a computer-readable medium comprising instructions stored therein, which when executed by the processors, cause the processors to perform operations comprising:
   receiving a musical file at an editing system;
   generating a cut vector derived from a plurality of identified temporal locations of a detected audio characteristic in the received musical file, wherein the identified temporal locations are identified based on analyzing alternative waveforms filtered from a primary waveform of the received musical file, and wherein two adjacent intervals formed by three identified temporal locations of the plurality of identified temporal locations are different;
   receiving image content items that are separate from the musical file;
   providing the image content items to an image sequencer;
   arranging, at the image sequencer of the editing system, the image content items such that frames occurring between cuts are indicated by cut times in the cut vector, wherein a first content item of the image content items occurs after a cut time indicated by cut vector, and a last content item of the image content items occurs before a subsequent cut time indicated by the cut vector; and
   outputting an edited multimedia sequence from a rendering of the image content items with the musical file.

8. The system of claim 7, wherein the operations further comprise:
   receiving an effects vector comprising a plurality of time values, wherein each of the time values is associated with an animation property;
   applying a first animation effect to at least one of the image content items of the edited multimedia sequence at a first time value of the plurality of time values based on a first animation property indicated by the effects vector; and
   applying a second animation effect to at least one of the image content items of the edited multimedia sequence at a second time value of the plurality of time values based on a second animation property indicated by the effects vector.

9. The system of claim 7, wherein the operations further comprise:
    combining the edited multimedia sequence with a digital music file to produce a mixed multimedia output file.

10. The system of claim 8, wherein the plurality of time values of the effects vector correspond with audio artifacts in the musical file.

11. The system of claim 7, wherein the image content items comprises a digital image.

12. The system of claim 7, wherein the image content items comprises a digital video.

13. A non-transitory computer-readable storage medium comprising instructions stored therein, which when executed by one or more processors, cause the processors to perform operations comprising:
    receiving a musical file at an editing system;
    generating a cut vector derived from a plurality of identified temporal locations of a detected audio characteristic in the received musical file, wherein the identified temporal locations are identified based on analyzing alternative waveforms filtered from a primary waveform of the received musical file, and wherein two adjacent intervals formed by three identified temporal locations of the plurality of identified temporal locations are different;
    receiving image content items that are separate from the musical file;
    providing the image content items to an image sequencer;
    arranging, at the image sequencer of the editing system, the image content items such that frames occurring between cuts are indicated by cut times in the cut vector, wherein a first content item of the image content items occurs after a cut time indicated by cut vector, and a last content item of the image content items occurs before a subsequent cut time indicated by the cut vector; and
    outputting an edited multimedia sequence from a rendering of the image content items with the musical file.

14. The non-transitory computer-readable storage medium of claim 13, wherein instructions further cause the processors to perform operations comprising:
    receiving an effects vector comprising a plurality of time values, wherein each of the time values is associated with an animation property;
    applying a first animation effect to at least one of the image content items of the edited multimedia sequence at a first time value of the plurality of time values based on a first animation property indicated by the effects vector; and
    applying a second animation effect to at least one of the image content items of the edited multimedia sequence at a second time value of the plurality of time values based on a second animation property indicated by the effects vector.

15. The non-transitory computer-readable storage medium of claim 13, wherein instructions further cause the processors to perform operations comprising:
    combining the edited multimedia sequence with a digital music file to produce a mixed multimedia output file.

16. The non-transitory computer-readable storage medium of claim 14, wherein the plurality of time values of the effects vector correspond with audio artifacts in the musical file.

17. The non-transitory computer-readable storage medium of claim 13, wherein the image content items comprises a digital image.

18. The non-transitory computer-readable storage medium of claim 13, wherein instructions further cause the processors to perform operations comprising:
    dividing the musical file into multiple segments, wherein the multiple segments have overlapping portions;
    performing a beat matching processing of the multiple segments; and
    providing a playback option of a resulting edited output file during the performing of the beat matching processing.

* * * * *